United States Patent
Azizi (10) Patent No.: US 7,647,315 B2
(45) Date of Patent: Jan. 12, 2010

(54) SYSTEM AND METHOD OF PROVIDING RELATIONAL SET OPERATIONS FOR MULTIDIMENSIONAL DATA SOURCES

(75) Inventor: Soufiane Azizi, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 11/472,795

(22) Filed: Jun. 22, 2006

(65) Prior Publication Data

US 2007/0061291 A1    Mar. 15, 2007

(30) Foreign Application Priority Data

Sep. 13, 2005    (CA) ................................... 2519015

(51) Int. Cl.
*G06F 17/30*    (2006.01)
(52) U.S. Cl. ..................... 707/5; 707/2; 707/3
(58) Field of Classification Search .............. 707/2, 707/3, 5
See application file for complete search history.

(56) References Cited

U.S. PATENT DOCUMENTS

| | | | | | |
|---|---|---|---|---|---|
| 5,721,903 | A | * | 2/1998 | Anand et al. ..................... 707/5 |
| 5,819,021 | A | * | 10/1998 | Stanfill et al. .................. 714/15 |
| 6,078,918 | A | * | 6/2000 | Allen et al. ..................... 707/6 |
| 6,446,059 | B1 | * | 9/2002 | Berger et al. ..................... 707/2 |
| 6,567,803 | B1 | * | 5/2003 | Ramasamy et al. ............. 707/4 |
| 6,574,623 | B1 | * | 6/2003 | Leung et al. ..................... 707/5 |
| 6,581,054 | B1 | * | 6/2003 | Bogrett ........................... 707/4 |
| 6,694,316 | B1 | * | 2/2004 | Langseth et al. .............. 707/10 |
| 6,732,091 | B1 | * | 5/2004 | Middelfart ...................... 707/3 |
| 6,931,418 | B1 | * | 8/2005 | Barnes .................. 707/103 R |
| 2003/0117637 | A1 | * | 6/2003 | Coleman .................... 358/1.13 |
| 2003/0212676 | A1 | * | 11/2003 | Bruce et al. ..................... 707/5 |
| 2004/0049505 | A1 | * | 3/2004 | Pennock ......................... 707/5 |
| 2004/0249810 | A1 | * | 12/2004 | Das et al. ........................ 707/5 |
| 2005/0033741 | A1 | * | 2/2005 | Dombroski et al. ............ 707/3 |
| 2005/0120018 | A1 | * | 6/2005 | Whitney, IV ................... 707/5 |
| 2006/0294087 | A1 | * | 12/2006 | Mordvinov .................... 707/4 |

* cited by examiner

*Primary Examiner*—Don Wong
*Assistant Examiner*—Kim T Nguyen
(74) *Attorney, Agent, or Firm*—Shumaker & Sieffert, P.A.

(57) ABSTRACT

A tabular set provider is provided for processing a data agnostic business intelligence query with relational set operations, herein called a relational query against a multidimensional datasource. The tabular set provider comprises a query interceptor, a query decomposer, an OLAP query provider interface, and an operation module. The query interceptor is provided for detecting and intercepting a data agnostic Business intelligence query that has relational set operations that is issued against one or more multidimensional data sources. The query decomposer is provided for decomposing the operands of the set operation in the input query into one or more sub-queries. The OLAP query provider interface is provided for sending the OLAP supported sub-queries to an OLAP query provider and receiving results. The operation module is provided for using set operation functionality provided by a relational query provider that performs the set operations locally on the results of the OLAP data extraction.

11 Claims, 11 Drawing Sheets

Query1

| Year | Revenue | Quantity sold |
|---|---|---|
| 2004 | $34,750,563.50 | 561,706 |
| 2005 | $62,558,488.56 | 789,730 |
| 2006 | $74,267,335.82 | 863,918 |

Query2

| Year | Revenue | Quantity Sold |
|---|---|---|
| 1996 | 986,968 | 34725 |
| 1997 | 1,278,295 | 46271 |

Query 3 = Query1 U Query2

| Year | Revenue | Quantity sold |
|---|---|---|
| 1996 | 986,968 | 34,725 |
| 1997 | 1,278,295 | 46,271 |
| 2004 | 34,750,563.5 | 561,706 |
| 2005 | 62,558,488.56 | 789,730 |
| 2006 | 74,267,335.82 | 863,918 |

Figure 11

SYSTEM AND METHOD OF PROVIDING RELATIONAL SET OPERATIONS FOR MULTIDIMENSIONAL DATA SOURCES

FIELD OF INVENTION

The present invention relates generally to a system and method for processing high level user requests containing one or more queries, and in particular to a system and method of providing relational set operations for online analytical processing (OLAP) sources.

BACKGROUND OF THE INVENTION

Many organizations use data stores for storing business data, such as financial data and operational data. In order to assist business users to examine their data, various data analyzing applications are proposed. Those data analyzing applications provide various views or reports of data to users. Those data analyzing applications typically have query engines that access the data stores to obtain desired data. The accessed data stores can be either relational or multidimensional stores, which are based on fundamentally different data storage technologies.

Those data analyzing applications issue requests of data from the data stores. A request may contain data agnostic business intelligence (BI) queries that may express algebraic set operations, such us union, except, and intersect, which are relational style operations. BI users can make such computations on relational data. There is a need for the ability to do the same computation natively on OLAP or dimensional data. Presently, users have had to extract dimensional data, transform, and load it (ETL) into relational database management systems (RDBMS) that provide such computation using the SQL query language. This ETL route is time consuming, requires the interventions of IT departments in large organizations, is error prone, and is inefficient compared to being able to perform such computation in the BI system directly.

Some data analyzing applications have Online Analytical Processing (OLAP) query engines to allow users to analyze multidimensional views of data. This type of OLAP is sometimes called Multidimensional OLAP (MOLAP). A MOLAP engine summarizes business data into multidimensional views in advance, and places the summarized data in a cube structure. When a user request is received, the MOLAP engine accesses the summarized data, and thus the MOLAP engine can provide a response to the query very fast. The user can rotate the cube structured data to see a desired view of the data using the MOLAP engine.

There also exist Relational OLAP (ROLAP) query engines that extract data from traditional relational databases. ROLAP engines are able to create multidimensional views on the fly. In order to extract data, those ROLAP engines typically use complex Structured Query Language (SQL) statements against relational tables in the relational databases. ROLAP engines tend to be used on data that has a large number of attributes, where the data cannot be easily placed into a cube structure. ROLAP engines support multidimensional queries issued against relational databases. Some ROLAP engines translate OLAP queries into SQL queries, and other ROLAP query engines implement the access to relational databases using internal communication between components responsible for OLAP and relational operations.

Both MOLAP and ROLAP approaches to the multidimensional data access, even though they use different data storage technologies, provide only the functionality of the multidimensional query language. This query language has a number of significant limitations when it comes to providing relational style set operations, such us the union, except, and intersect operations between set operands.

On the other side is the relational query language, SQL, providing a powerful set of operations that manipulate data in accordance with the relational algebra. This set of operations includes the relational style operations that are not natively supported by the multidimensional technologies, including the union, except, and intersect operations between set operands. While SQL is ideal for processing transactional data, it has a number of significant limitations when it comes to data analysis and reporting.

SUMMARY OF THE INVENTION

The present invention intercepts data agnostic business intelligence (BI) query that has relational style set operations that is issued against one or more multidimensional data sources, and decomposes it into sub-queries to execute the query.

It is an object of the invention to provide an improved system and method for decomposition of a data agnostic business intelligence query against one or more multidimensional data sources.

According to the present invention there is provided a tabular set provider for processing a data agnostic business intelligence query that has relational style set operations that are not supported natively by the underlying multidimensional data sources. The tabular set provider comprises a query interceptor, a query decomposer, an OLAP query provider interface, and an operation module. The query interceptor is provided for detecting and intercepting a data agnostic Business intelligence query that has relational set operations that is issued against one or more multidimensional data sources. The query decomposer is provided for decomposing the operands of the set operation in the input query into one or more sub-queries. The OLAP query provider interface is provided for sending the OLAP supported sub-queries to an OLAP query provider and receiving results. The operation module is provided for using set operation functionality provided by a relational query provider that performs the set operations locally on the results of the OLAP data extraction.

In accordance with another aspect of the present application, there is provided a query decomposer for decomposing data agnostic business intelligence queries that contain relational set operations. The query decomposer comprises a set operation identifier, an OLAP sub-queries extractor, a relational set operation creator, and a post-processing query creator. The set operation identifier analyzes the incoming data agnostic query in order to identify sub-queries that represent the operands of a query set operation against OLAP data sources. The OLAP sub-queries extractor extracts the operands of the set operation; each operand represents a query that is sent to the OLAP query provider for preparation and execution. The relational set operation creator creates a plan to perform the set operation on results received from the OLAP query provider using services provided by the relational query provider. The post-processing query creator builds a plan that outlines all operations that need to be applied to the results of the execution of the relational query provider of the set operation. This post-processing phase of the query decomposition is important as it assures that the results set that is sent to the Data Analyzing System is cast in terms of the original query that was issued by this system and not in terms of decomposed sub-queries.

In accordance with another aspect of the present application, there is provided a method of processing a data agnostic business intelligence query against one or more data sources. The method comprises steps of detecting and intercepting a data agnostic business intelligence query that is issued against one or more multidimensional data sources; decomposing operands of a query operation source of the data agnostic business intelligence query into one or more OLAP sub-queries; and replacing the data agnostic business intelligence query with a stack of operations expressed by the decomposed OLAP sub-queries and the relational set operation query for execution.

In accordance with another aspect of the present application, there is provided a method of decomposing a data agnostic business intelligence query applied against one or more multidimensional data sources. The method comprises the steps of identifying sub-queries that represent the operands of query set operation; extracting the identified operands into sub-queries; sending the extracted OLAP supported sub-queries to an OLAP query provider, and preparing a plan to perform the set operations on results that will be received from an OLAP query provider using services provided by a relational query provider.

In accordance with another aspect of the present application, there is provided a memory containing computer executable instructions that can be read and executed by a computer for caring out a method of processing a data agnostic business intelligence query against one or more data source. The method comprises steps of detecting and intercepting a data agnostic business intelligence query that is issued against one or more multidimensional data sources; decomposing operands of a query operation source of the data agnostic business intelligence query into one or more OLAP sub-queries; and replacing the data agnostic business intelligence query with a stack of operations expressed by the decomposed OLAP sub-queries and the relational set operation query for execution.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

The present invention allows for the computation of relational set operations such as union, intersect, and except for data extracted from OLAP (or multidimensional) sources that do not support these computations natively.

Figure 1:
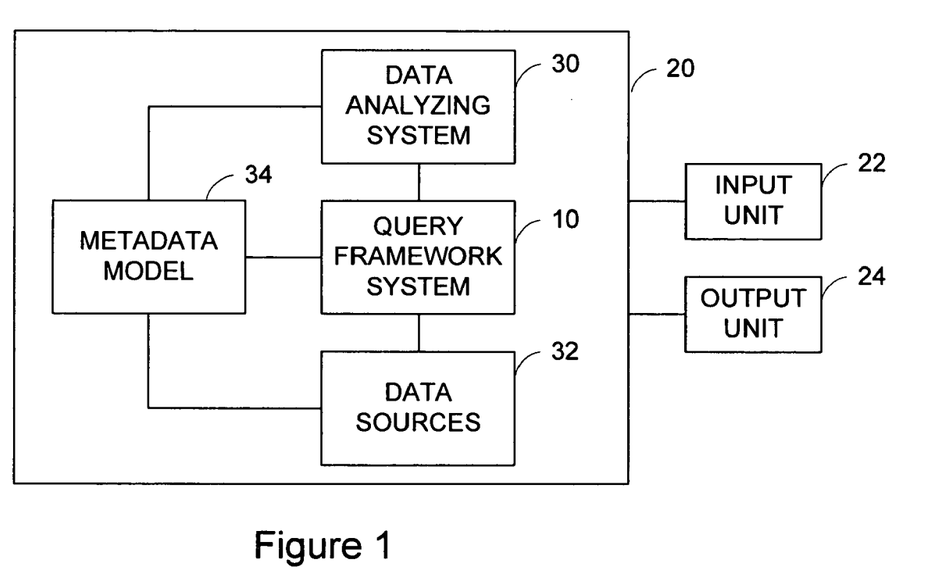
FIG. 1 shows in a block diagram an example of a query framework system in which an example of a tabular set provider is suitably used, in accordance with an embodiment of the present invention.
Figure 2:
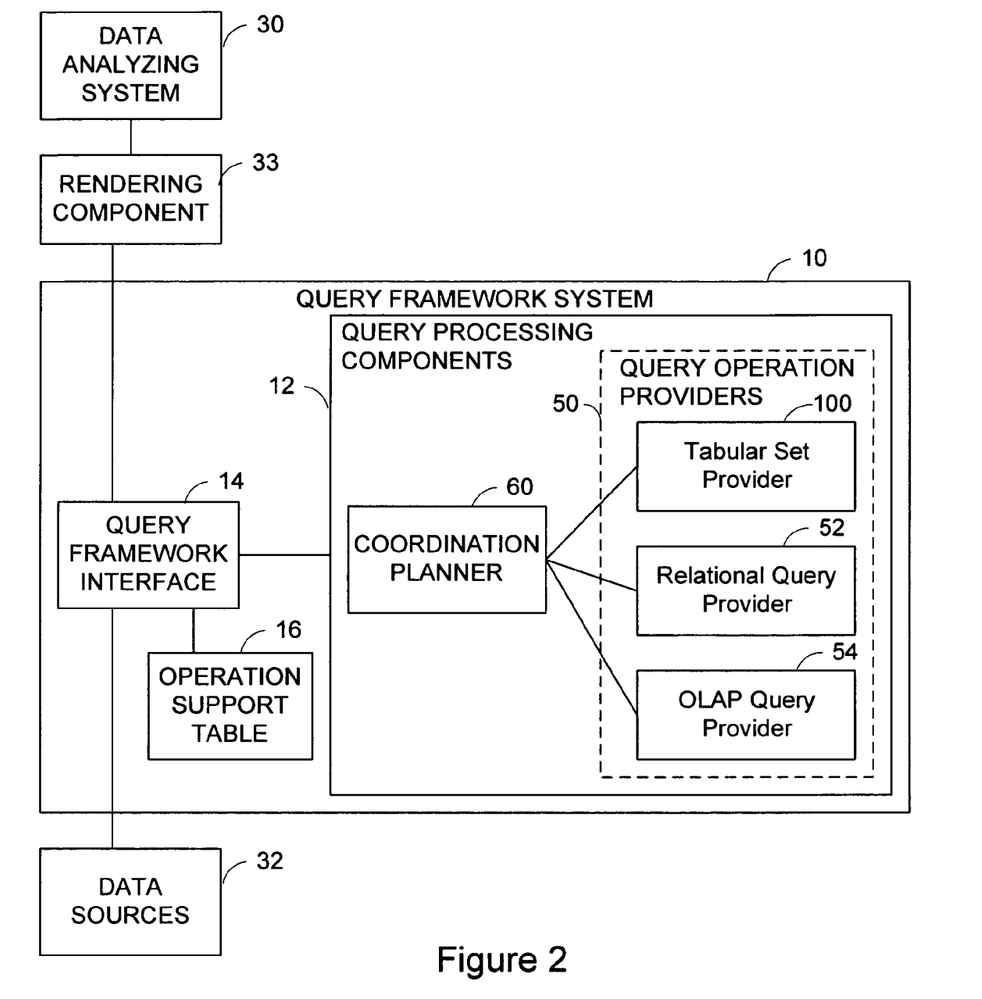
FIG. 2 shows in a block diagram the query framework system in more detail.

FIGS. 1 and 2 show a query framework system 10 in which a tabular set provider 100 (FIG. 2) in accordance with an embodiment of the application is suitably used. The tabular set provider 100 may be a standalone pluggable component as shown in FIG. 2, or a part of a component that processes high level user requests. The following descriptions describe an embodiment of the tabular set provider as a standalone component, but the invention is not limited to such an embodiment.

The query framework system 10 is used in a computer system 20 having an input unit 22 and an output unit 24. The query framework system 10 is provided to receive user requests from a data analyzing system 30 and process the received user requests to retrieve requested data from one or more data sources 32.

The data analyzing system 30 is an application that provides various views of data in the data sources 32 to allow users to analyze the data. When a user requests a view of data, the data analyzing system 30 generates a user request. A user request typically contains multiple queries. To generate user requests, the data analyzing system 30 may use a metadata model 34 that contains metadata of the data sources 32. The user request is in a query language that the data analyzing system 30 uses to issue the user request. Some data analyzing system 30 may issue a user request in a data source language, such as SQL, and some data analyzing system 30 may issue a user request in a language specific to the data analyzing system 30.

The data analyzing system 30 issues user requests in a data agnostic querying language or specification. The data agnostic querying specification allows combining query elements involving relational operations and OLAP operations. Accordingly, a data agnostic query issued by the data analyzing system 30 may involve both relational and OLAP operations, only relational operations, or only OLAP operations.

The query framework system 10 intercepts user requests generated by the data analyzing system 30. It processes and executes the user requests to retrieve desired data from the data sources 32.

As shown in FIG. 2, the query framework system 10 has multiple query processing components 12. Query processing components 12 share a common interface 14 and a common query language of the query framework system 10. Query processing components 12 are pluggable components. Query processing components 12 include a set of query operation providers 50, and a coordination planner 60. The query framework system 10 may also have an operation support table 16 that describes functionalities of the query operation providers 50.

The coordination planner 60 organizes interaction between the query processing components 12. The interaction is carried out through the common interface 14 and based on the common query language. The coordination planner 60 divides the query processing into two phases: query planning or preparation phase and a query execution phase. During the query preparation phase, the coordination planner 60 interacts with components in order to identify and plan the operations associated with each component involved in the query preparation process, and to determine the sequence of these operations. The coordination planner 60 may use one or more query operation providers 50 during the query preparation phase. During the query execution phase, the coordination planner 60 distributes the query operations to associated query operation providers 50. The coordination planner 60 invokes the query operations in the sequence determined at the preparation phase.

During the preparation phase, the coordination planner 60 converts a user request received from the data analyzing system 30 into a converted query or a query framework (QF) query. A QF query plays the role of a query specification that the query operation providers 50 use to communicate to each other and to the coordination planner 60 within the query framework system 10. The QF query definition is an extension of the user request specification defined by the data analyzing system 30. The coordination planner 60 and the query framework system 10 are further described in Canadian Patent Application No. 2,518,902 entitled "System and Method for Query Planning and Execution".

Each query operation provider 50 is capable of performing a specific operation on queries. The query operation providers 50 include a relational query provider 52, OLAP query provider 54, and the tabular set provider 100. There may be more query operation providers in the query framework system 10.

The OLAP query provider 54 is capable of processing OLAP queries, i.e., queries of the system query language involving OLAP operations only. The union, intersect, and except operations which act on rows of operand queries are relational type operations that are not supported by the OLAP query provider 54. The operation of the OLAP query provider 54 involves translation of the system query language into the query language of underling multidimensional data sources 32, which is MDX.

The relational query provider 52 is capable of processing relational queries. It provides tabular operations to received queries. The operation of the relational query provider 52 involves translation of the system query language into the query language of underling relational data sources 32, which is SQL. The relational query provider 52 is also capable of receiving the data upon which the relational queries act. The operations in the input relational queries are applied to the input data stream. The relational query provider 52 provides the services needed in order to compute the relational set operations like the union, intersect, and except operations on data streams representing the operands of these operations.

The tabular set provider 100 is a query transformation component plugged into the query framework system 10 governed by the coordination planner 60. The tabular set provider 100 is a transformation provider which is responsible for preprocessing of the received user request, and transforms the received user request into a QF query in order, for example, to make it simpler or supported by other components in the query framework system 10.

The tabular set provider 100 uses a query decomposition process that bridges between functionality available in relational operations and multidimensional operations. It allows relational set operations, such us union, intersect, and except, against multidimensional data sources that do not natively support these relational set operations.

The tabular set provider 100 plays part in data agnostic user experience, e.g., the same look and feel against relational and multidimensional data sources, including the set of functions shared across multidimensional and relational data sources. The tabular set provider 100 allows the relational and multidimensional operations combined in a single query. In this embodiment, the logic of the query decomposition is implemented as a tabular set provider 100 which is a pluggable component in the query framework system 10. Accordingly, its functionality can be reused for different variations of data sources. Also, its behavior may be tweaked in the system 10 by pre-processing incoming queries or post-processing the results of the decomposition. In a different embodiment, the functionality of the tabular set provider 100 may be incorporated into other component.

Figure 3:
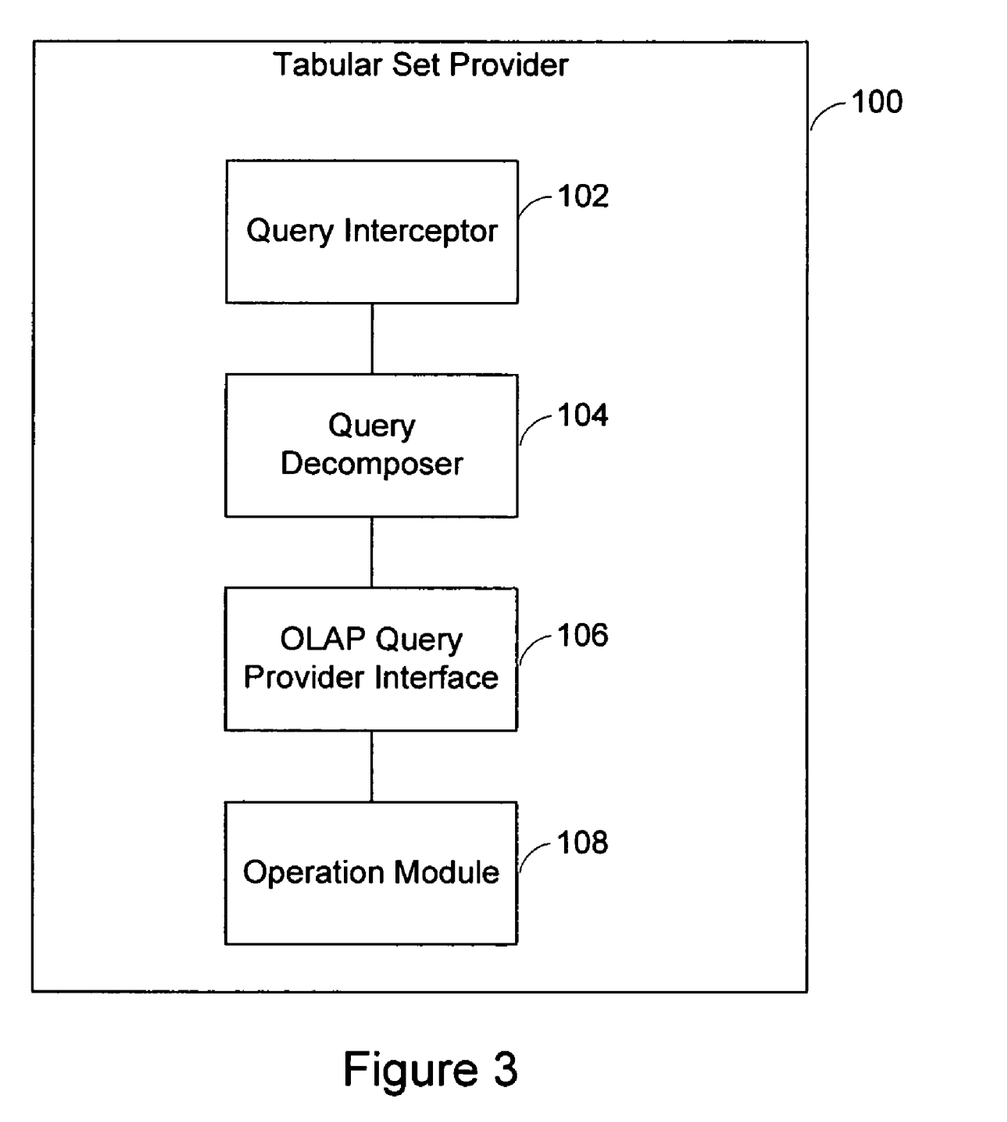
FIG. 3 shows in a block diagram an example of a tabular set provider, in accordance with an embodiment of the present invention.

As shown in FIG. 3, the tabular set provider 100 has a query interceptor 102, query decomposer 104, an OLAP query provider interface 106, and an operation module 108. The query interceptor 102 detects and intercepts queries requiring its involvement, the main type of which is queries that involve relational set operations, such as the union, intersect, and except issued against multidimensional data sources 32. The query decomposer 104 decomposes these queries into three specifications, as further described below. The OLAP query provider interface 106 is used for sending multidimensional queries to a multidimensional query provider and for receiving results. The operation module 108 is a relational query interface that is used to compute the set operations on results coming from the OLAP query provider.

Figure 4:
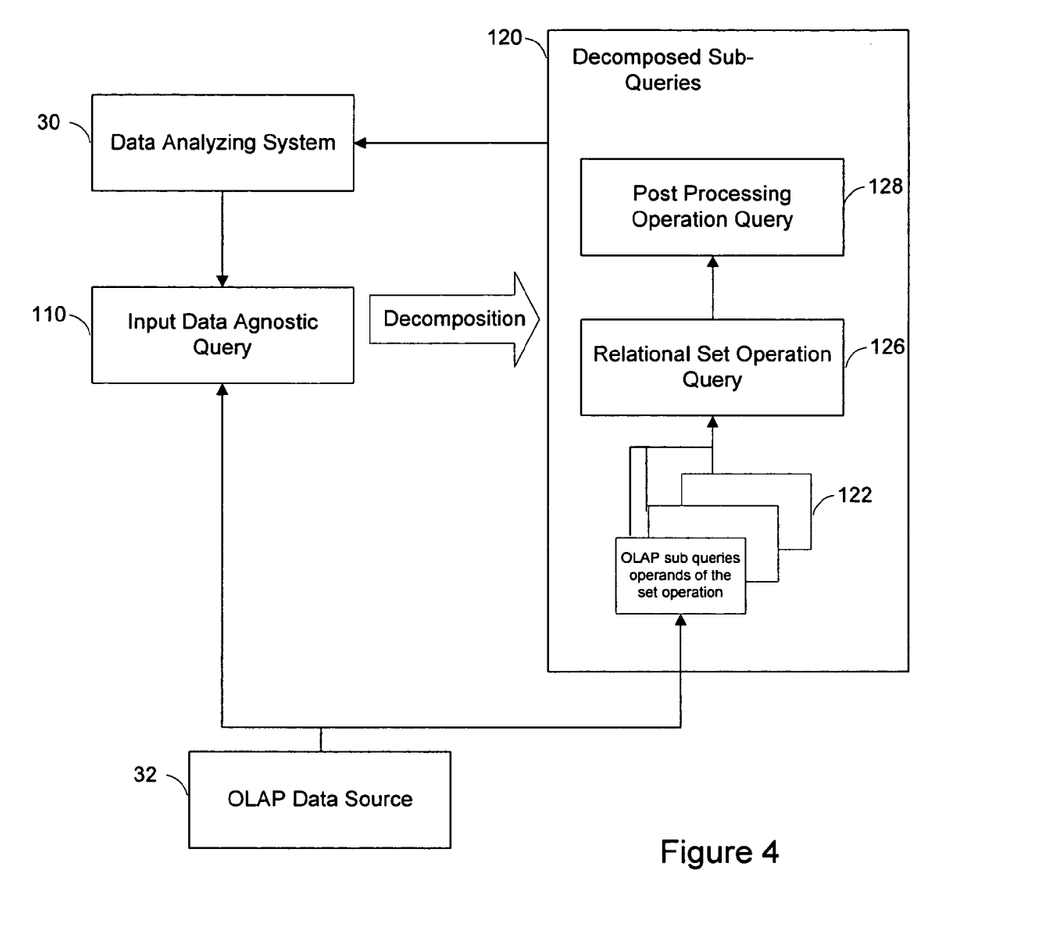
FIG. 4 schematically shows in a diagram the decomposition of a data agnostic business intelligence query, in accordance with an embodiment of the tabular set provider.

FIG. 4 schematically illustrates an example of decomposition of a multidimensional query 110 intercepted by the tabular set provider 100. The data agnostic input query 110 is decomposed into three specifications 120. The three specifications 120 are a set of OLAP sub-queries 122 each corresponding to an operand of the set operation, a relational set operation query 126, and a post-processing operation query 128. Each sub-query in the set of OLAP sub-queries 122 has a QF query specification that involves only OLAP operations and is sent to the OLAP query provider 54 for execution. The relational set operation query 126 has a QF query specification that involves only relational operations. This query 126 is sent to the relational query provider 52 for execution. The post processing operation query 128 is a query representing an operation of adjusting data set information to correspond to column information expressed in the metadata model rather than the structure of the input data streams, one per sub-query, that is extracted from the OLAP query provider 54 by the OLAP query provider interface 106 and passed to the relational query provider 52 by the operation module 108. The post processing operation is handled by the tabular set provider 100 itself.

Figure 5:
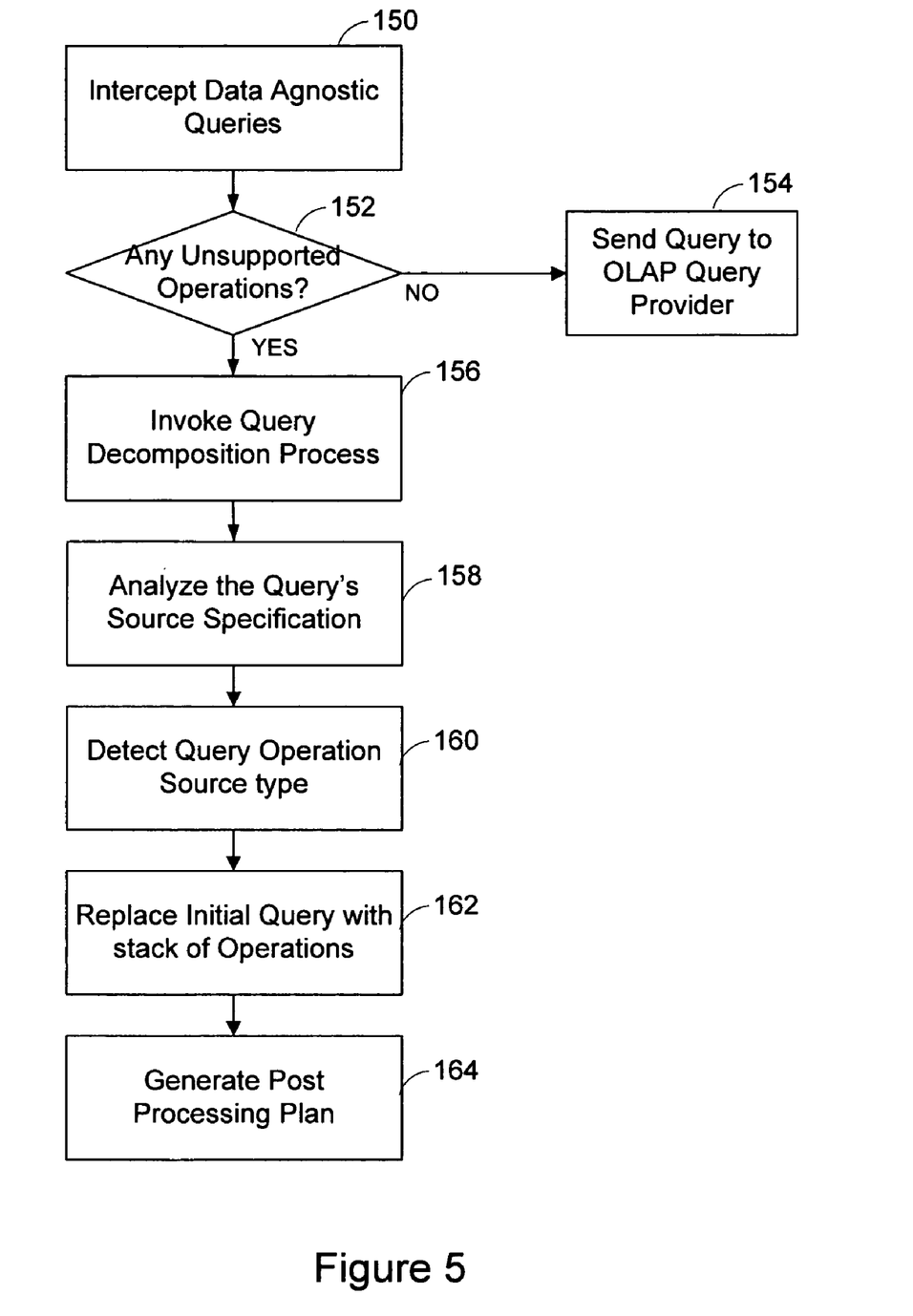
FIG. 5 shows in a flowchart the operation of the tabular set provider.

Referring to FIG. 5, the operation of the tabular set provider 100 and the decomposition rules are described. The tabular set provider 100 detects and intercepts an input data agnostic query issued against the multidimensional data source 32 (150). The tabular set provider 100 checks if the input data agnostic query has a source specification that represents a query operations between 2 or more sub-query operands (152). To determine if the set operations are unsupported, the tabular set provider 100 may use the operation support table 16 to refer to the functionalities that are supported by the OLAP query provider 54. If the input data agnostic query does not have a query operation source specification, the query is sent to the OLAP query provider 54 (154) by the coordination planner 60 for execution.

If the data agnostic query has a source specification that represents a set operation between two or more sub-queries, the tabular set provider 100 invokes the query decomposer 104 to decompose the input data agnostic query (156). The query decomposer 104 analyses the incoming query's source specification (158) in order to detect the query operation source type and extract the operands of this query operation (160).

The initial data agnostic query is then replaced with stack of operations (162) based on the results of the decomposition of the query at step 160. The set of OLAP supported sub-queries are then sent to the OLAP query provider 54 by the OLAP query provider interface 106 and the resulting data streams, each corresponding to a sub-query operand, are sent to the relational query provider 52 along with the set operation query and results are received by the operation modules.

The tabular set provider 100 finally performs a data set information post processing operation (164). The tabular set provider adjusts the data set information to correspond to column information expressed in the metadata model rather than the structure of the input data streams that is extracted from the OLAP query provider and passed to the relational query provider.

Figure 6:
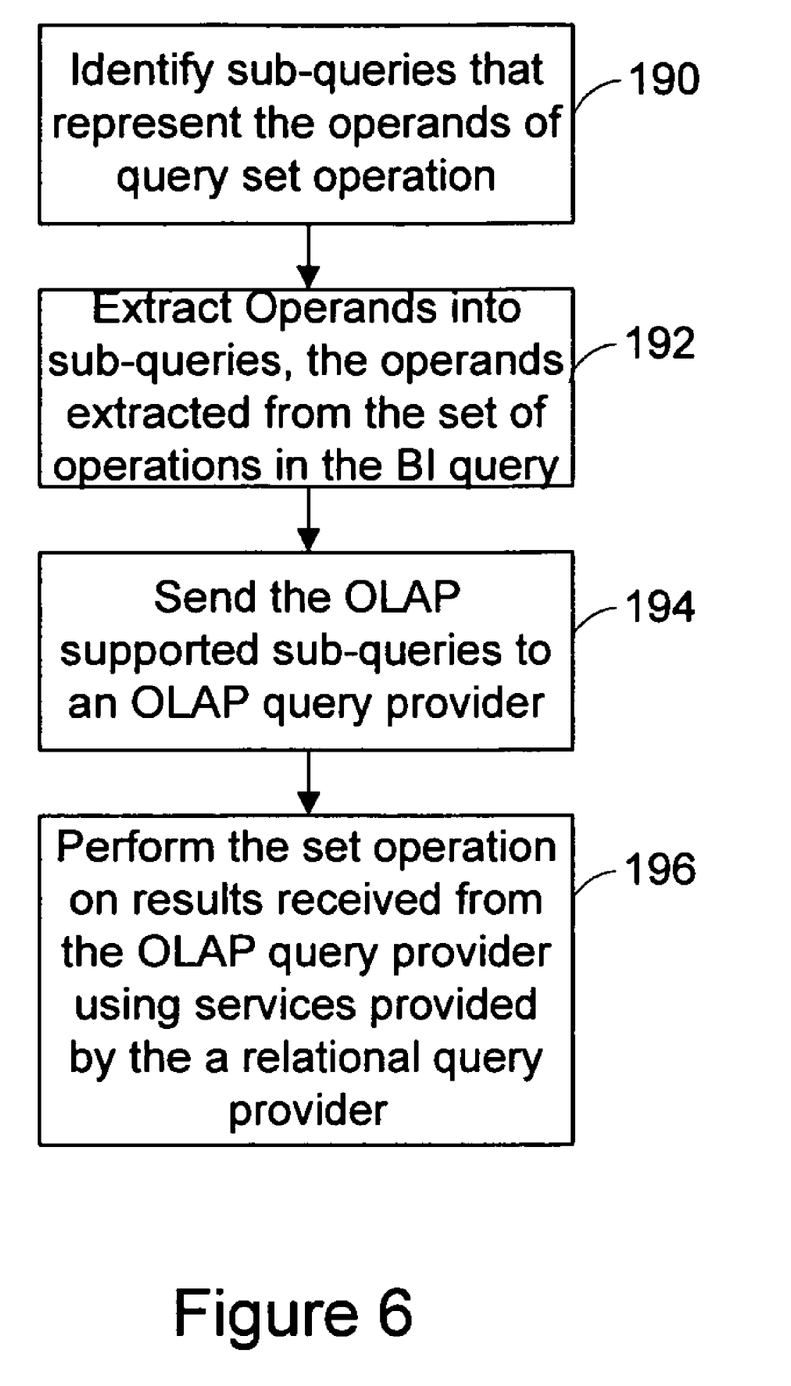
FIG. 6 shows in a flowchart a decomposition process by the tabular set provider.

In order to perform the decomposition of expressions at step 160, as shown in FIG. 6, the query decomposer 104 may have to identify sub-queries that represent the operands of a query set operations as specified in the source of the initial data agnostic input query (190). The query decomposer 104 may then have to extract operands into sub-queries (192). The query decomposer may then have to create and send the OLAP sub-queries to an OLAP query provider 54 (194), and performs the set operation on results received from the OLAP query provider (54) using services provided by the relational query provider (196).

Figure 7:
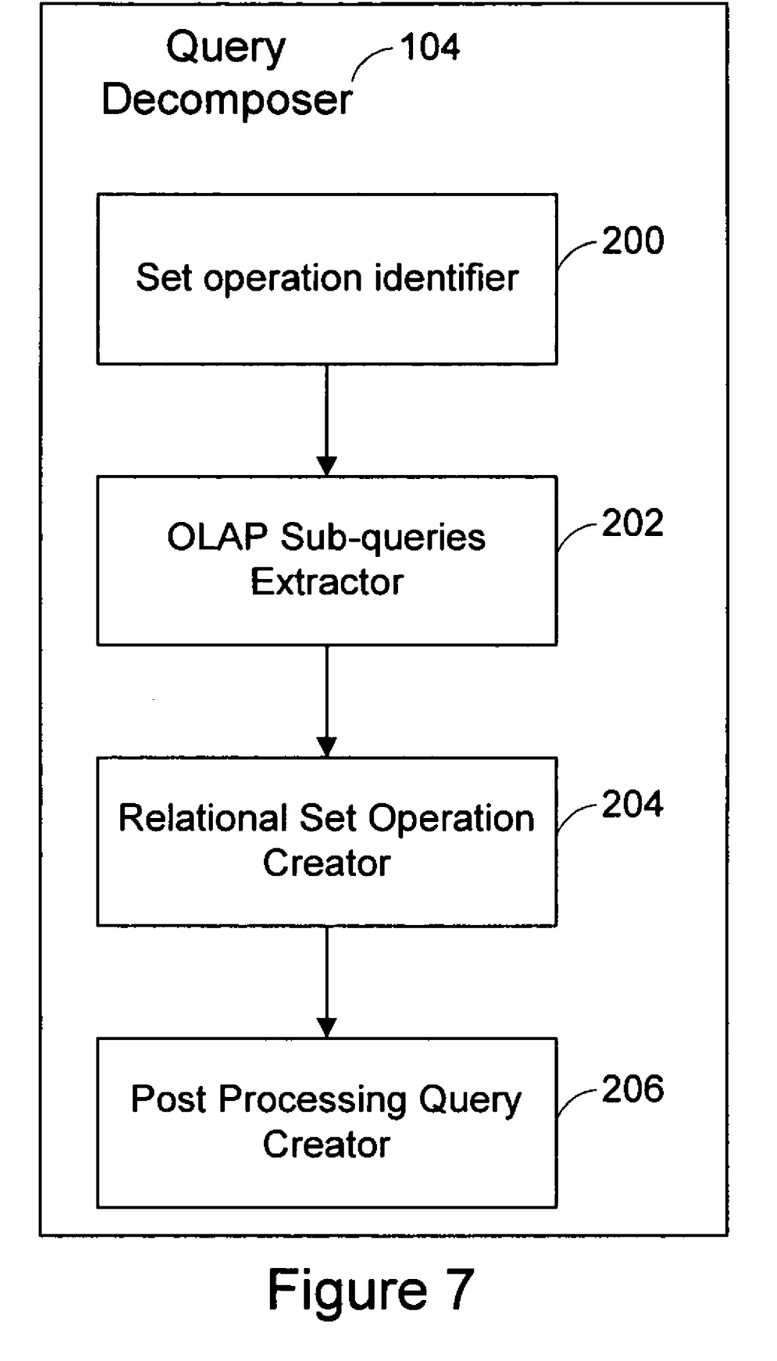
FIG. 7 shows in a block diagram a query decomposer in accordance with an embodiment of the tabular set provider.

The decomposition may be carried out as shown in FIG. 7. The set operation identifier 200 of the query decomposer 104 identifies sub-queries that represent the operands of a query set operation in a source specification that is unsupported by an OLAP query provider 54. The OLAP sub-queries extractor 202 extracts operands into sub-queries that are supported by the OLAP query provider 54. The operand sub-queries are extracted from the set operation as specified in the source of the incoming business intelligence data agnostic query. The query decomposer 104 uses the relational set operation creator 204 in order to create one query for the relational query provider 52 and to use its services to execute the relational set operation. Finally, the query decomposer 104 uses the post processing query creator 206 in order to prepare a post processing plan that will ensure that the data set information returned to the data analyzing system is consistent with the input data agnostic query.

An example of software implementation of the tabular set provider 100, TabularOpeartionProvider, in accordance with an embodiment of the invention is now described. In this embodiment, the query framework system 10 receives from the data analyzing system 30 a user request that has a <queryResultDefinition> section. Each expression in the user request is analyzed in the context of the <queryResultDefinition> section of the user request. An example of the user request that is described in FIG. 8 to FIG. 11 is the following:

```
<?xml version="1.0" encoding="UTF-8"?>
<qs:command xmlns:qs="http://developer.cognos.com/schemas/qsapi/2/">
    <connection>
        <QFProviderType value="QueryFrameworkService"/>
        <productLocale value="en"/>
        <runLocale value="en-us"/>
        <serviceID value="RSVP"/>
        <sessionID value="010:0743ad7d-e670-11da-8f45-cf8dd0d60ece:3678379425"/>
        <CAMPassport value="010:0743ad7d-e670-11da-8f45-cf8dd0d60ece:3678379425"/>
        <contentManagerURI value="http://127.0.0.1:9300/p2pd/servlet"/>
    </connection>
    <execute>
        <querySet expressionLocale="en-us">
            <modelPath>/content/package[@name='Two OLAP Data Sources&aposmodelPath>
            <queries>
                <query name="Query1">
                    <source>
                        <model/>
                    </source>
                    <selection>
                        <dataItem aggregate="none" name="Year">
                            <expression>[Great_Outdoors_Company].[Years].[Years].[Year]</expression>
                        </dataItem>
                        <dataItem name="Revenue">
                            <expression>[Great_Outdoors_Company].[Measures].[Revenue]</expression>
                        </dataItem>
                        <dataItem name="Quantity sold">
                            <expression>[Great_Outdoors_Company].[Measures].[Quantity sold]</expression>
                        </dataItem>
                    </selection>
                </query>
                <query name="Query2">
                    <source>
                        <model/>
                    </source>
                    <selection>
                        <dataItem aggregate="none" name="Year">
                            <expression>[Great outdoors_].[Years].[Years].[Year]</expression>
                        </dataItem>
                        <dataItem name="Revenue">
                            <expression>[Great outdoors_].[Measures].[Revenue]</expression>
                        </dataItem>
                        <dataItem name="Quantity Sold">
```

```
                    <expression>[Great outdoors_].[Measures].[Quantity
Sold]</expression>
                </dataItem>
            </selection>
        </query>
        <query name="Query3">
            <source>
                <queryOperation name="Union1" setOperation="UNION">
                    <queryRefs>
                        <queryRef refQuery="Query1"/>
                        <queryRef refQuery="Query2"/>
                    </queryRefs>
                    <projectionList autoGenerated="true">
                        <queryItem name="Year"/>
                        <queryItem name="Revenue"/>
                        <queryItem name="Quantity sold"/>
                    </projectionList>
                </queryOperation>
            </source>
            <selection>
                <dataItem name="Year">
                    <expression>[Union1].[Year]</expression>
                </dataItem>
                <dataItem name="Revenue">
                    <expression>[Union1].[Revenue]</expression>
                </dataItem>
                <dataItem name="Quantity sold">
                    <expression>[Union1].[Quantity sold]</expression>
                </dataItem>
            </selection>
        </query>
    </queries>
    <queryResultDefinitions>
        <queryResultDefinition name="Query3.0" refQuery="Query3">
            <edges>
                <edge name="3">
                    <edgeGroups>
                        <edgeGroup>
                            <valueSets>
                                <valueSet name="7">
<groupBody name="7_groupBody">
<dataItemRef refDataItem="Year"/>
<dataItemRef refDataItem="Revenue"/>
<dataItemRef refDataItem="Quantity sold"/>
</groupBody>
                                </valueSet>
                            </valueSets>
                        </edgeGroup>
                    </edgeGroups>
                </edge>
            </edges>
        </queryResultDefinition>
    </queryResultDefinitions>
    </querySet>
    </execute>
</qs:command>
```

The <queryResultDefinition> in this example reference "Query3", which is defined as follows:

```
<query name="Query3">
    <source>
        <queryOperation name="Union1" setOperation="UNION">
            <queryRefs>
                <queryRef refQuery="Query1"/>
                <queryRef refQuery="Query2"/>
            </queryRefs>
            <projectionList autoGenerated="true">
                <queryItem name="Year"/>
                <queryItem name="Revenue"/>
                <queryItem name="Quantity sold"/>
            </projectionList>
        </queryOperation>
    </source>
```

-continued

```
    <selection>
        <dataItem name="Year">
            <expression>[Union1].[Year]</expression>
        </dataItem>
        <dataItem name="Revenue">
            <expression>[Union1].[Revenue]</expression>
        </dataItem>
        <dataItem name="Quantity sold">
            <expression>[Union1].[Quantity sold]</expression>
        </dataItem>
    </selection>
</query>
```

The source of "Query3" in this example is a <queryOperation> element that has the attributes name "Union1" and a setOperation "UNION". Hence "Query3" is a query that has a source specification indicating that it is a union operation. The operands of this union operation are the children element in this specification, which are specified under the element <queryRefs>. The referenced queries are "Query1" and "Query2" which are specified in the complete example above.

"Query1" and "Query2" are the extracted sub-queries that are supported by the OLAP query provider 54. They are sent for execution to the OLAP query provider 54 for executions and the resulting data streams are fed to the relational query provider 52 along with the set operation specification for execution. The results from the relational query provider 52 are post processed and sent back to the data analyzing system.

FIGS. 8 to 11 show in screenshots examples of set operations handled by the tabular set provider component, in accordance with an embodiment of the tabular set provider 100.

EXAMPLE 1

Figure 8:
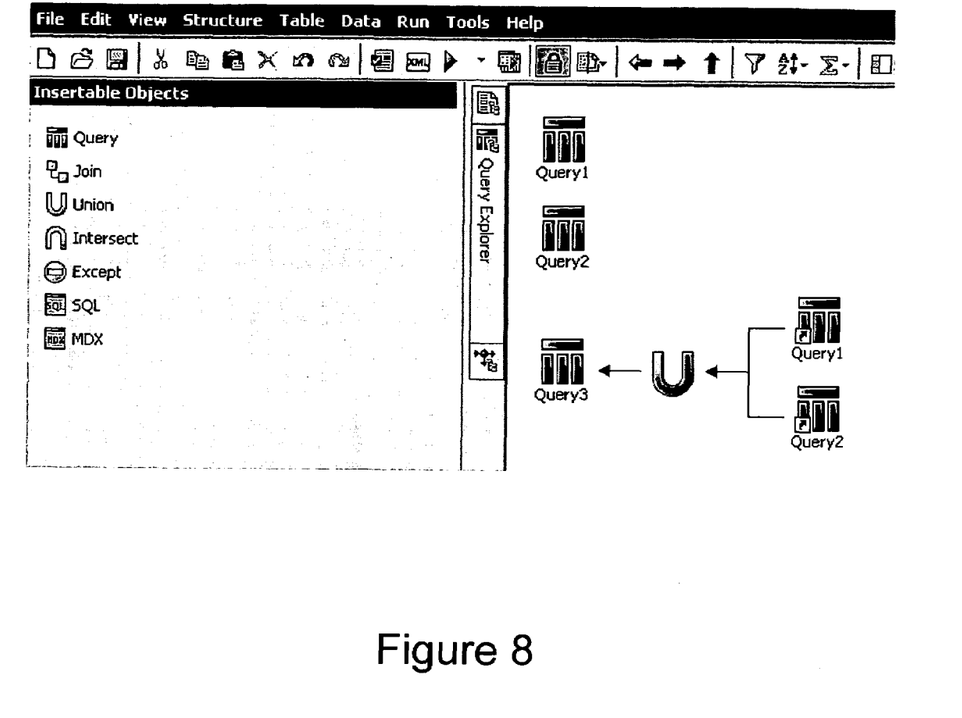
FIG. 8 shows in a screen shot an example data analyzing system's representation of a query set operation that can be expressed as a request to the query framework.

FIG. 8 shows in a screen shot an example data analyzing system's representation of a query set operation that can be expressed as a request to the query framework as discussed above. In this screen shot, "Query3" is formulated through few user interface gestures as the set union of "Query1" and "Query2".

EXAMPLE 2

Figure 9:
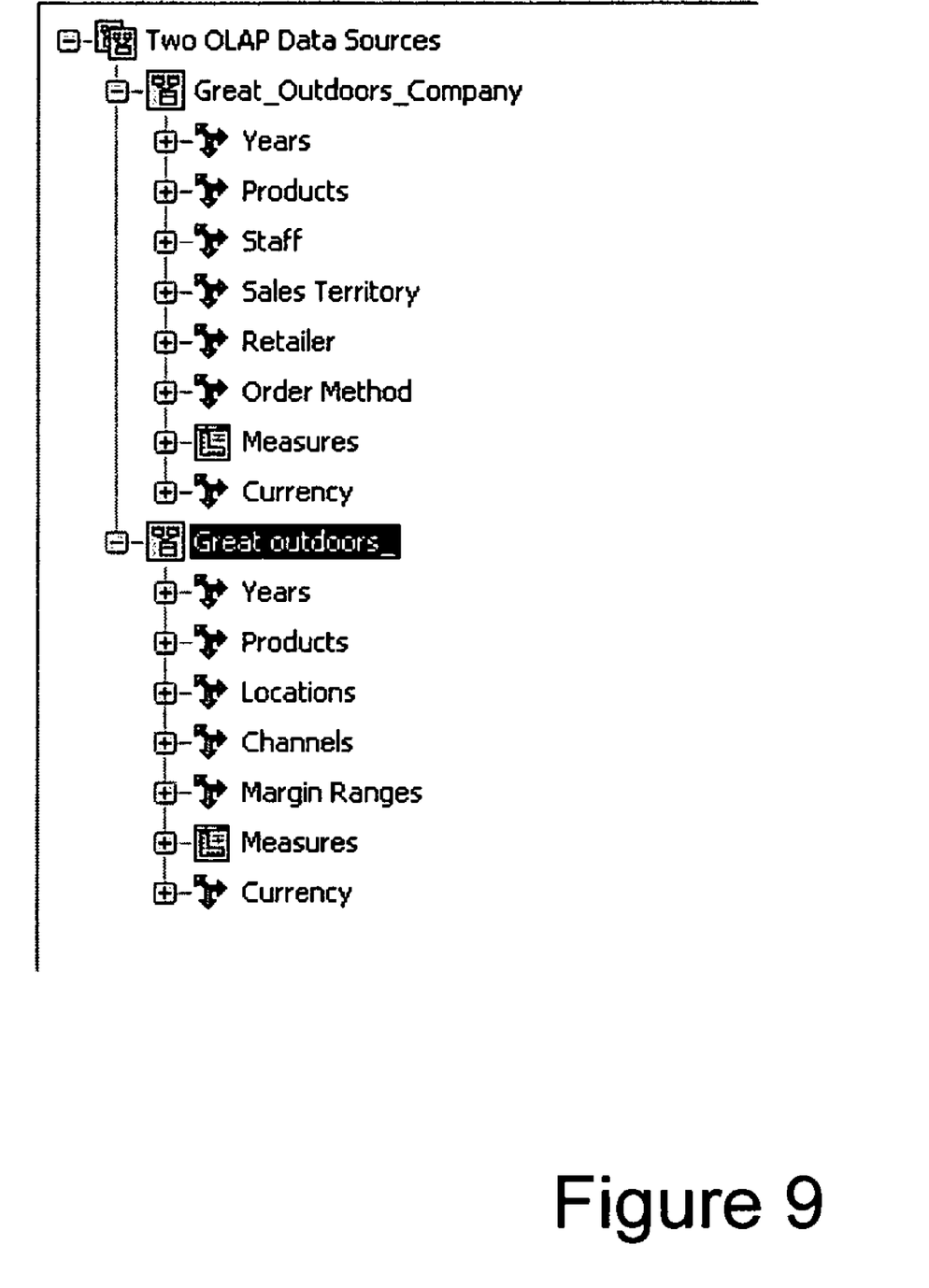
FIG. 9 shows in a screenshot of the two data sources that are the targets of "Query1" and "Query2" respectively.

FIG. 9 shows in a screenshot of the two data sources that are the targets of "Query1" and "Query2" respectively. "Query1" extract data from the first OLAP data source "Great Outdoors Company" that contains sample data of a fictitious company. The data contains many dimensions along the business of this fictitious company, such us Time, Products, Geography, etc. The data contains many measures for analysis, such us Revenue and Quantity sold. "Query2" extracts data from the second OLAP data source "Great Outdoors" which contain the same business dimensions and analysis measures for the fictitious company. The difference between the two data sources is that the first data source contains recent data relating to the years 2004, 2005, 2006. The second data source contains historic data relating to the years 1996 and 1997. The user would like to produce a report that contains both recent and historic data for the revenues and quantity sold measures. Hence, he needs to union the data from "Query1" and "Query2".

EXAMPLE 3

Figure 10:
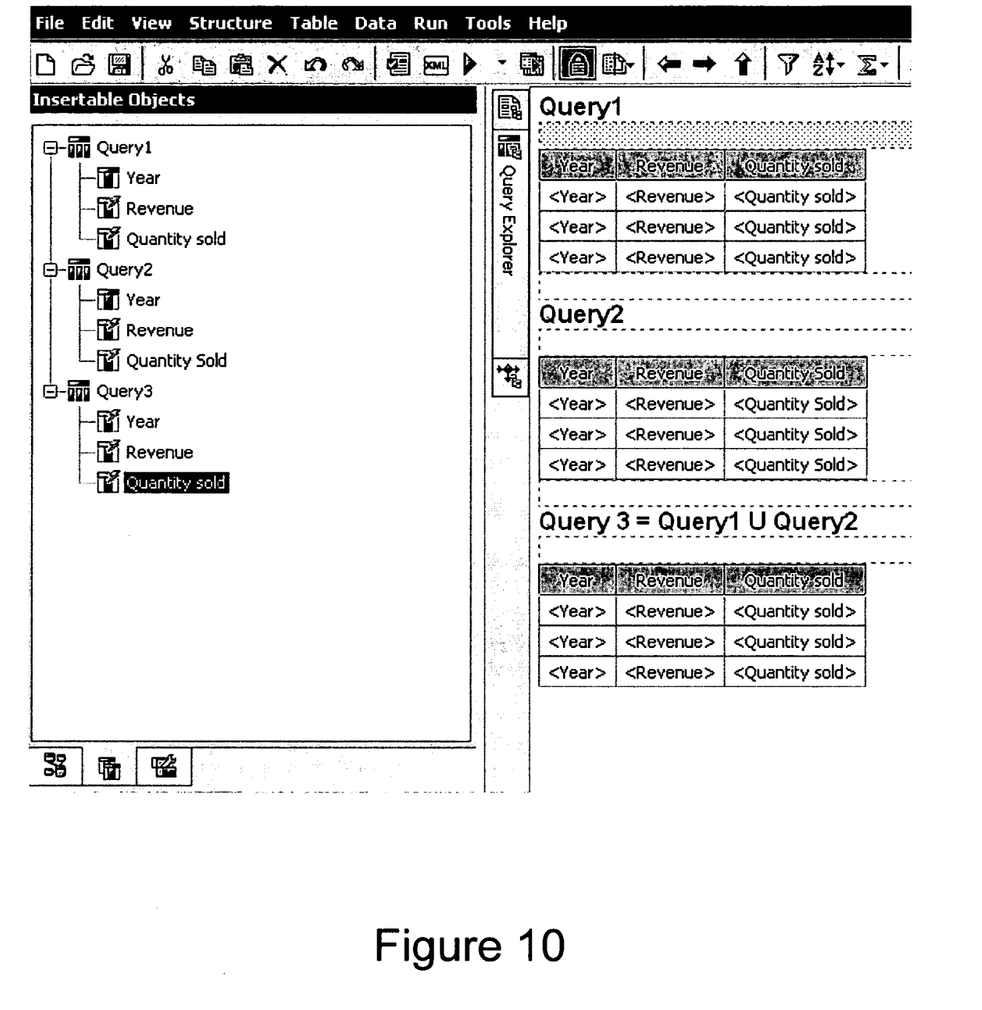
FIG. 10 shows in a screenshot the report of FIG. 9.

FIG. 10 shows in a screenshot the report described in Example 2.

EXAMPLE 4

Figure 11:
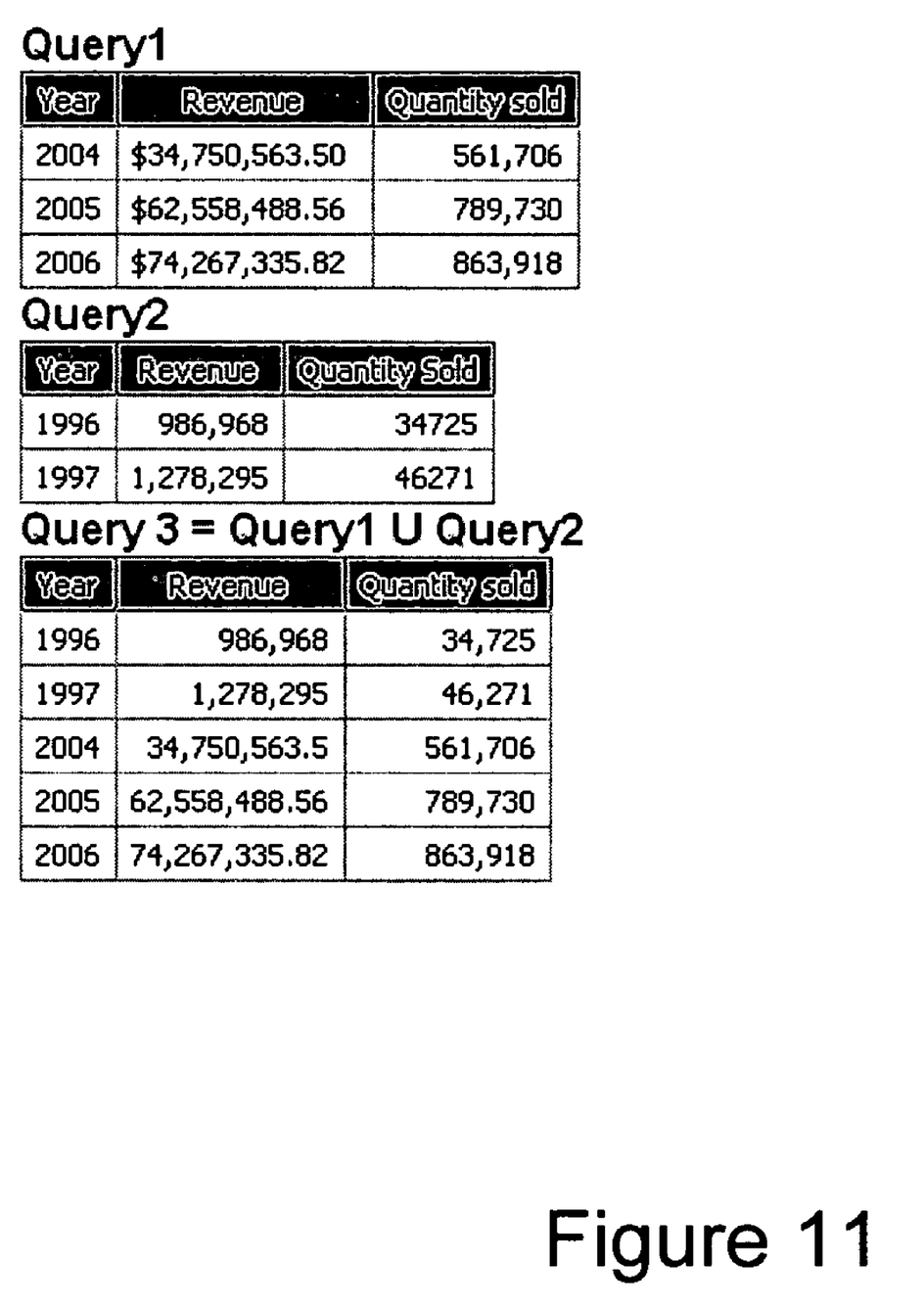
FIG. 11 shows in a screenshot the results of the report for "Query1", "Query2" and their union, "Query3".

FIG. 11 shows in a screenshot the results of the report for "Query1", "Query2" and their union, "Query3".

The systems and methods according to the present invention may be implemented by any hardware, software or a combination of hardware and software having the functions described above. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A method of processing a data agnostic business intelligence query against one or more data sources, the method comprising:
    detecting and intercepting, by a computer, a data agnostic business intelligence query that is issued against one or more multidimensional data sources;
    decomposing a relational set operation contained in the data agnostic business intelligence query into two or more sub-queries handled by an online analytical processing (OLAP) query provider that queries the one or more multidimensional data sources, wherein the relational set operation is not natively supported by the OLAP query provider, and wherein each sub-query is supported by the OLAP query provider and represents an operand of the relational set operation;
    sending the two or more sub-queries to the OLAP query provider for execution;
    receiving resultant OLAP data streams generated from the execution of the two or more sub-queries, each resultant OLAP data stream corresponding to a sub-query operand for the relational set operation; and
    sending the resultant OLAP data streams to a relational query provider for execution of the relational set operation.

2. The method as recited in claim 1, wherein the decomposed sub-queries comprise multidimensional sub-queries sent to the OLAP query provider that is capable of executing multidimensional query operations.

3. The method as recited in claim 1, wherein the relational set operation and the resultant OLAP data streams are sent to the relational query provider that is capable of executing relational query operations.

4. The method as recited in claim 1, wherein the decomposing includes identifying sub-queries that represent operands of the relational set operation that is unsupported by the OLAP query provider, and extracting relational set operands into the sub-queries that are supported by the OLAP query provider, and wherein the method further comprises:
    creating one query for the relational query provider and executing the relational set operation along with sub-query operands represented by the resultant OLAP data streams; and
    preparing a post processing plan to return a data set that is consistent with the data agnostic business intelligence query.

5. The method as recited in claim 1, wherein the decomposing includes using an operation support table describing operations supported by the OLAP query provider.

6. A query framework system for processing data agnostic business intelligence queries, the system comprising:
    a computer;
    a query interceptor, executable by the computer, to detect and intercept a data agnostic business intelligence query that is issued against one or more multidimensional data sources;
    a query decomposer, executable by the computer, to decompose a relational set operation contained in the data agnostic business intelligence query into two or more sub-queries handled by an online analytical processing (OLAP) query provider that queries the one or more multidimensional data sources, wherein the relational set operation is not natively supported by the OLAP query provider, and wherein each sub-query is supported by the OLAP query provider and represents an operand of the relational set operation;

an OLAP query provider interface, executable by the computer, to send the two or more sub-queries to the OLAP query provider for execution and receiving the resultant OLAP data streams generated from the execution of the two or more sub-queries, each resultant OLAP data stream corresponding to a sub-query operand for the relational set operation; and an operation module, executable by the computer, to send the resultant OLAP data streams to a relational query provider for execution of the relational set operation.

7. The system as recited in claim 6, wherein the OLAP query provider is capable of executing multidimensional query operations.

8. The system as recited in claim 6, wherein the relational query provider is capable of executing relational query operations.

9. The system as recited in claim 6, wherein the query decomposer further comprises:

a set operation identifier to identify the operands of the relational set operation that is not natively supported by the OLAP query provider;

an OLAP sub-queries extractor to extract each of the operands into one of the two or more sub-queries that are supported by the OLAP query provider;

a relational set operation creator to create one query for the relational query provider using the resultant OLAP data streams; and a post-processing query creator to prepare a post processing plan to return a data set that is consistent with the data agnostic business intelligence query.

10. The system as recited in claim 6, wherein the query decomposer uses an operation support table describing operations supported by the OLAP query provider.

11. A computer readable storage medium containing computer executable instructions for causing a computer to:

detect and intercepting a data agnostic business intelligence query that is issued against one or more multidimensional data sources;

decompose a relational set operation contained in the data agnostic business intelligence query into two or more sub-queries handled by an online analytical processing (OLAP) query provider that queries the one or more multidimensional data sources, wherein the relational set operation is not natively supported by the OLAP query provider, and wherein each sub-query is supported by the OLAP query provider and represents an operand of the relational set operation;

send the two or more sub-queries to the OLAP query provider for execution;

receiving resultant OLAP data streams generated from the execution of the two or more sub-queries, each resultant OLAP data stream corresponding to a sub-query operand for the relational set operation; and send the resultant OLAP data streams to a relational query provider for execution of the relational set operation.

* * * * *